United States Patent Office 3,129,246
Patented Apr. 14, 1964

3,129,246
3,5-DINITROBENZOYLUREAS
Guy H. Harris, Concord, Calif., Patricia I. Traylor, Cambridge, Mass., and Bryant C. Fischback, Walnut Creek, Calif., assignors to The Dow Chemical Company, Midland, Mich., a corporation of Delaware
No Drawing. Continuation of application Ser. No. 770,580, Oct. 30, 1958. This application June 23, 1961, Ser. No. 119,031
4 Claims. (Cl. 260—552)

This invention is directed to compounds corresponding to the formula

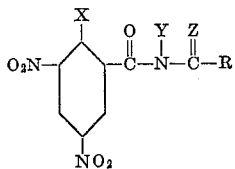

In this and succeeding formulae, X represents hydrogen, methoxy, methyl or ethyl, Y represents hydrogen, methyl or ethyl, Z represents oxygen or sulfur and R represents alkoxy, alkylmercapto, amino or lower alkylamino. The expressions alkoxy and alkyl are employed in the present specification and claims to refer to radicals containing from 1 to 12 carbon atoms, inclusive, and the expression lower alkyl to refer to radicals containing from 1 to 5 carbon atoms, inclusive. These new compounds are crystalline solids which are somewhat soluble in many organic solvents and of very low solubility in water. They have been found to be useful as parasiticides and are adapted to be employed as active toxic constituents of compositions for the control of a number of helminth, insect, fungal and protozoan organisms such as southern armyworms, *Alternaria solani, Eimeria tenella* and *Eimeria necatrix*.

The new compounds may be prepared by mixing or otherwise blending together an acid halide corresponding to the formula

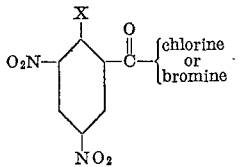

with an alkyl carbamate, alkyl thiocarbamate, alkyl thiolcarbamate, alkyl dithiocarbamate, urea, thiourea or alkyl substituted urea or thiourea corresponding to the formula

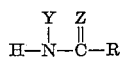

The reaction is carried out at a temperature at which halide of reaction is formed from the halogen in the acid halide reactant. This halide appears in the reaction mixture as hydrogen halide. The reaction may be carried out in an organic solvent as reaction medium such as dioxane and in the presence of a hydrogen halide acceptor such as pyridine. The reaction proceeds smoothly at temperatures of from 30° up to 250° C. with the production of the desired product and hydrogen halide of reaction. In carrying out the reaction substantially all of the halide in the acid halide reagent may be recovered as hydrogen halide. Upon completion of the reaction, the desired product may be separated by conventional methods such as filtration, decantation, washing with water and evaporation of any employed reaction solvent.

The following examples merely illustrate the invention and are not to be construed as limiting.

*Example 1.—3,5-Dinitrobenzoylurea*

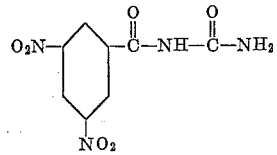

3,5-dinitrobenzoylchloride (23.1 grams; 0.1 mole) was dispersed in 50 milliliters of dioxane and the resulting mixture added portionwise with stirring to 13.2 grams (0.22 mole) of urea dispersed in 75 milliliters of dioxane. The addition was carried out over a period of one hour and the reaction mixture thereafter heated at the boiling temperature and under reflux for 2.5 hours. The reaction was accompanied by the evolution of hydrogen chloride; the evolution being substantially complete toward the end of the heating period. Following the heating period, the reaction solvent was removed by evaporation to obtain a 3,5-dinitrobenzoylurea product as a crystalline residue. This product was recrystallized from a mixture of water and dimethyl formamide and found to melt at 247.5°–248° C., and have a carbon content of 39.3 percent as compared with a theoretical content of 37.8 percent.

*Example 2.—Methyl (3,5-Dinitro-o-Toluoyl) Carbamate*

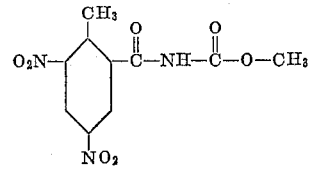

3,5-dinitro-o-toluoyl chloride (20 grams; 0.082 mole) and 8.2 grams (0.11 mole) of methyl carbamate were mixed together and heated at gradually increasing temperatures up to a temperature of 190° C. The heating was accompanied by the evolution of hydrogen chloride of reaction; the evolution being substantially complete toward the end of the heating period. The reaction mixture was then cooled to room temperature. During the cooling the mixture solidified and the solidified product was thereafter successively recrystallized from toluene and ethanol. As a result of these operations, there was obtained a methyl (3,5-dinitro-o-toluoyl) carbamate product melting at 192°–195° C. and having a carbon content of 42.10 percent as compared with a theoretical content of 42.41 percent.

*Example 3.—Ethyl (3,5-Dinitro-o-Toluoyl) Carbamate*

3,5-dinitro-o-toluoyl chloride (44.1 gms; 0.18 mole) was dispersed in 100 milliliters of dioxane and the resulting mixture was added to 44.6 grams (0.5 mole) of ethyl carbamate dissolved in 200 milliliters of dioxane. The resulting mixture was then heated for 2.5 hours at the boiling temperature and under reflux. Toward the end of the heating period the evolution of hydrogen chloride of reaction was substantially complete. The solvent was then removed from the reaction mixture by evaporation to obtain an ethyl (3,5-dinitro-o-toluoyl) carbamate product as a crystalline residue. This product was recrystallized from ethanol and found to melt at 162°–164° C. and have a carbon content of 44.3 percent as compared to a theoretical content of 44.45 percent.

*Example 4.—Methyl (3,5-Dinitro-o-Toluoyl) Thiolcarbamate*

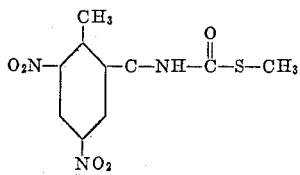

3,5-dinitro-o-toluoyl chloride (24.5 grams; 0.1 mole) and 27.3 grams (0.3 mole) of methyl thiolcarbamate were dispersed in 200 milliliters of dioxane and the resulting mixture heated at a temperature of 100° C. until the evolution of hydrogen chloride was substantially complete. The dioxane was then removed by evaporation and the residue washed with sodium bicarbonate and thereafter recrystallized from isopropanol. As a result of these operations, there was obtained a methyl (3,5-dinitro-o-toluoyl) thiolcarbamate product melting at about 160° C. with decomposition and containing 10.74 percent sulfur as compared with a theoretical content of 10.71 percent.

*Example 5.—3,5-Dinitro-o-Toluoylurea*

3,5-dinitro-o-toluoyl chloride (48.8 grams; 0.2 mole) and 60 grams 1.0 mole) of urea were dispersed in 350 milliliters of dioxane and the resulting mixture heated at the boiling temperature and under reflux until the evolution of hydrogen chloride of reaction was substantially complete. The heating was carried out with stirring and over a period of two hours. Following the heating period, the solvent was removed by evaporation to obtain a 3,5-dinitro-o-toluoyl urea product as a crystalline residue. This product was recrystallized from an aqueous dioxane solution and found to melt at 233°–234° C. and have a carbon content of 40.55 percent as compared with a theoretical content of 40.3 percent.

*Example 6.—1,1-Dimethyl-3-(3',5'-Dinitrobenzoyl)-2-Thiourea*

1,1-dimethyl-2-thiourea (5.2 grams; 0.5 mole) was added to 11.5 grams (0.05 mole) of 3,5-dinitrobenzoyl chloride dispersed in 25 milliliters of pyridine and the resulting mixture gradually warmed to a temperature of 60° C. and maintained at this temperature for ten minutes. The reaction mixture was thereafter diluted with an excess of dilute aqueous hydrochloric acid, cooled and filtered. As a result of these operations there was obtained a 1,1-dimethyl-3-(3',5'-dinitrobenzoyl)-2-thiourea product as a crystalline residue. This product was recrystallized from acetic acid and found to melt at 140°–142° C. and have a sulfur content of 10.57 as compared with a theoretical content of 10.74 percent.

*Example 7.—n-Butyl (3,5-Dinitro-o-Toluoyl) Carbamate*

3,5-dinitro-o-toluoyl chloride (24.5 grams; 0.1 mole) and 12.9 grams (0.11 mole) of n-butyl carbamate were mixed together and the resulting mixture heated at gradually increasing temperatures up to a temperature of 220° C. and until the evolution of hydrogen chloride of reaction was substantially complete. The reaction mixture was then recrystallized from toluene to obtain a n-butyl (3,5-dinitro-o-toluoyl)carbamate product melting at 163°–165° C. and having a carbon content of 48.21 percent as compared with a theoretical content of 48.03 percent.

*Example 8.—2-Ethylhexyl (3,5-Dinitro-o-Toluoyl) Carbamate*

3,5-dinitro-o-toluoyl chloride (24.5 grams; 0.1 mole) and 18.8 grams (0.11 mole) of 2-ethylhexyl carbamate were mixed together and heated at gradually increasing temperatures up to a temperature of 230° C. and until the evolution of hydrogen chloride of reaction was substantially complete. The reaction mixture was then recrystallized from toluene to obtain a 2-ethylhexyl (3,5-dinitro-o-toluoyl)-carbamate product melting at 136.6°–137.2° C.

In a similar manner, other products may be prepared of which the following are representative:

1,1 - diamyl - 3 - (3',5' - dinitro - o - toluoyl) - 2-thiourea by reacting 3,5-dinitro-o-toluoyl bromide with 1,1-diamyl-2-thiourea.

1,3-diethyl-3-(3',5'-dinitro-o-toluoyl) urea by reacting 3,5-dinitro-o-toluoyl bromide with 1,3-diethyl urea.

1 - ethyl - 3,3 - di - tertiarybutyl - 1 - (3',5' - dinitro-2'-ethylbenzoyl)urea by reacting 3,5-dinitro-2-ethylbenzoyl chloride with 1-ethyl-3,3-di-tertiarybutylurea.

1 - methyl - 3,3 - dipropyl - 1 - (3',5' - dinitrobenzoyl) urea by reacting 3,5-dinitrobenzoyl chloride with 1-methyl-3,3-dipropylurea.

1,1 - diamyl - 3 - (3',5' - dinitro - 2' - methoxybenzoyl)-2-thiourea by reacting 3,5-dinitro-2-methoxybenzoyl chloride with 1,1-diamyl-2-thiourea.

1 - ethyl - 3,3 -dimethyl - 1 - (3',5' - dinitro - 2' - methoxybenzoyl) urea by reacting 3,5-dinitro-2-methoxybenzoyl chloride with 1ethyl-3,3-dimethylurea.

Hexyl (3,5-dinitro-2-ethylbenzoyl)thiolcarbamate by reacting 3,5-dinitro-2-ethylbenzoyl chloride with hexyl thiolcarbamate.

Isopropyl (3,5-dinitro-o-toluoyl)ethylcarbamate by reacting 3,5-dinitro-o-toluoyl bromide with isopropyl ethylcarbamate.

Dodecyl (3,5 - dinitro - 2 - methoxybenzoyl)dithiocarbamate by reacting 3,5-dinitro-2-methoxybenzoyl chloride with dodecyl dithiocarbamate.

Octyl 3,5 - dinitrobenzoyl)methylthiolcarbamate by reacting 3,5-dinitrobenzoyl chloride with octyl methylthiocarbamate.

Decyl (3,5-dinitro-2-methoxybenzoyl)thiocarbamate by reacting 3,5-dinitro-2-methoxybenzoyl chloride with decyl thiocarbamate.

Methyl (3,5-dinitro-2-ethylbenzoyl)ethylthiocarbamate by reacting 3,5-dinitro-2-ethylbenzoyl chloride with methyl ethylthiocarbamate.

Amyl (3,5-dinitrobenzoyl)methyldithiocarbamate by reacting 3,5-dinitrobenzoyl chloride with amyl methyldithiocarbamate.

The compounds of the present invention have been found to be useful as parasiticides and as anthelmintics for the control of gastro-intestinal parasites in warm blooded animals. In such use, the unmodified compounds are employed or a composition containing the compounds in admixture with an innocuous ingestible adjuvant or a finely divided solid such as alcohol, syrups, edible oils, chalk, bentonite, grain rations, feed concentrates or supplements or animal feeds. The products also are employed as constituents of aqueous dispersions or oil-in-water emulsions with or without the addition of surface active dispersing agents. In representative operations, the feeding as a sole ration to chickens of a commercial poultry mash containing 0.01 percent by weight of the products of the present invention gives substantially complete controls of *Eimeria tenella* and cecal coccidiosis in the birds.

The 3,5-dinitrobenzoyl halides and 3,5-dinitro-2-alkylbenzoyl halides employed as starting materials in accordance with the teachings of the present invention may be prepared by reacting a suitable 3,5-dinitro-2-arenoic acid with thionyl chloride ($SOCl_2$), thionyl bromide, or phosphorus pentachloride to produce the corresponding and desired acid halide. The 3,5-dinitro-2-methoxybenzoyl halides employed as starting materials may be prepared by reacting an alkali metal methoxide with an alkali metal salt of 3,5-dinitro-2-chlorobenzoic acid whereby a methoxy group is substituted for chlorine to produce an alkali metal salt of 3,5-dinitro-2-methoxybenzoic acid. The salt is then converted to the corresponding acid and thereafter reacted with thionyl halide to produce the desired starting material.

This is a continuation of prior application Serial No. 770,580 filed Oct. 30, 1958.

We claim:
1. A compound corresponding to the formula

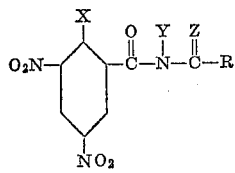

wherein X represents a member of the group consisting of hydrogen, methoxy, methyl and ethyl, Y represents a member of the group consisting of hydrogen, methyl and ethyl, Z represents a member of the group consisting of oxygen and sulfur, and R represents a member of the group consisting of amino and lower alkylamino.
2. 3,5-dinitrobenzoylurea.
3. 3,5-dinitro-o-toluoylurea.
4. 1,1-dimethyl-3-(3′,5′-dinitrobenzoyl)-2-thiourea.

References Cited in the file of this patent
UNITED STATES PATENTS
2,945,062    Hinman _____ July 12, 1960
OTHER REFERENCES
Abrahart: J. Chem. Soc. (1936), pp. 1273–4.